Patented Sept. 23, 1952

2,611,769

UNITED STATES PATENT OFFICE 2,611,769

PREPARATION OF VINYL PYRIDINES

John T. Hays, Wilmington, Del., assignor to Hercules Powder Company, Wilmington, Del., a corporation of Delaware No Drawing. Application August 2, 1947,
Serial No. 765,807

2 Claims. (Cl. 260—290)

This invention relates to vinyl pyridines and, more particularly, to the dehydrogenation of ethyl pyridines to give the corresponding vinyl derivatives.

Various methods have been suggested for producing vinyl pyridines but these methods have been disadvantageous in that a relatively large number of steps were involved and in that low yields were obtained. As a result, such methods did not lend sufficient simplicity for application to commercial use. As previously carried out in the art, vinyl pyridines usually have been obtained by the condensation of formaldehyde with a methyl pyridine to produce the corresponding pyridyl ethanol. Such a compound was then converted to the vinyl derivative by either one of two processes. Dehydration of the alcohol comprised one method of obtaining the vinyl compound. The other method involved replacement of the hydroxyl group of the alcohol with chlorine, followed by dehydrohalogenation of the chloro compound to the vinyl derivative. It is quite apparent that these methods for obtaining vinyl pyridines would not be feasible from the standpoints of economy, simplicity, and high yield.

Now, in accordance with this invention, it has been found that vinyl pyridines may be prepared directly from the corresponding ethyl pyridines by passing the latter over an active high temperature dehydrogenation catalyst at temperatures between about 450° C. and about 800° C. This process is relatively free of side reactions and after separation of the vinyl compound the unreacted ethyl pyridine may be recycled, thus giving a continuous process for production of the vinyl pyridine.

In carrying out the process in accordance with this invention, an ethyl pyridine, such as 5-ethyl-2-methylpyridine, may be passed through a hot tube containing a high temperature dehydrogenation catalyst, such as chromium oxide supported on alumina. The temperature may be maintained in the neighborhood of 600° C., and a flow rate of about 0.6 may be utilized. Substantial conversion of the ethyl pyridine to the corresponding vinyl compound will take place rapidly. Complete conversion of the ethyl pyridine to the vinyl compound ordinarily does not take place, consequently the reaction products may be separated by fractional distillation or crystallization, or a combination of both.

The following example constitutes a specific embodiment of the invention. All parts given in the example represent parts by weight.

EXAMPLE

The dehydrogenation apparatus was of the gravity feed type and consisted of a spiral tube preheater leading into a vertical iron tube, to the lower end of which was attached an efficient multitube water-cooled condenser. The catalyst tube contained a thermocouple well and was charged with a catalyst consisting of 12% chromium oxide on alumina. Nitrogen was passed slowly over the catalyst bed to flush out any oxygen, and at the same time the catalyst tube was heated to a temperature of about 610° C. 5-ethyl-2-methylpyridine was then passed through the hot apparatus at a rate which produced a steady stream of gas through an exit bubbler. A sample of the crude reaction mixture was analyzed from time to time to determine the amount of 2-methyl-5-vinylpyridine present. A series of runs were made using 5-ethyl-2-methylpyridine, the results of which are found in the following table.

Table I

| Run No. | Amount of Catalyst | Amount of 5-Ethyl-2-Methyl-Pyridine | Time (Hrs.) | Space Velocity (Parts of 5-Ethyl-2-Methyl-Pyridine/Part of Catalyst/Hour) | Average Temperature |
|---|---|---|---|---|---|
| | | | | | °C. |
| 1 | 69.5 | 303.5 | 6 | 0.727 | 600 |
| 2 | 70.0 | 219 | 6 | 0.522 | 600 |
| 3 | 66.0 | 245 | 6 | 0.619 | 600 |
| 4 | 65.0 | 280 | 6 | 0.719 | 600 |
| 5 | 65.0 | 294 | 7½ | 0.604 | 600 |
| 6 | 65.0 | 238 | 6¼ | 0.561 | 622 |
| 7 | 65.0 | 258 | 7 | 0.568 | 625 |

The seven reaction mixtures were combined to give 1599 parts of a product which contained 16% 2-methyl-5-vinylpyridine as determined by hydrogenation analysis.

The combined reaction mixture was charged into a distillation vessel which was attached to a 20-plate glass helices-packed fractionation column. The product then was subjected to fractional distillation, the temperature at the top of the column varying from about 62° C. to about 86° C. at a pressure of 28 to 29 mm. of mercury. Fourteen separate fractions were collected and the last three fractions (boiling points at 29 mm.: 84.0°, 85.6° and 79.8° C., respectively; refractive indices at 20° C.: 1.5119, 1.5316 and 1.5413, respectively) were crystallized and recrystallized at a temperature of —60° C. from commercial pentane from which the material boiling above 40° C. had been removed. In the final recrystallization, upon evaporating the excess solvent utilizing moderate vacuum, there was obtained pure 2-methyl-5-vinylpyridine. This compound had a melting point of —7° C., absorbed 1.65% (theoretical 1.68%) hydrogen in the presence of a palladium catalyst and formed a crystalline picrate which was canary yellow in color and had a melting point of 160–161° C.

Although the example has shown only the use of 5-ethyl-2-methylpyridine, other ethyl pyridines are operable in accordance with the process of this invention. The ethyl pyridine may be a simple derivative, such as 2-, 3-, or 4-ethyl pyridine, or it may be an ethyl pyridine which also contains another alkyl substituent, such as the 5-ethyl-2-methylpyridine utilized in the example or such as 2,5-diethyl pyridine. The process, in other words, is generally applicable to all alkyl pyridines in which at least one of the alkyl substituents is an ethyl group. The 5-ethyl-2-methylpyridine shown by the example may be made by the condensation of acetaldehyde, in the form of paraldehyde, with ammonia in the presence of glacial acetic acid. These reactants may be heated for about 6 hours at 185° C. in an autoclave in order to produce a reaction mixture which upon fractional distillation will afford a yield of about 65% of 5-ethyl-2-methylpyridine, based upon the amount of acetaldehyde used.

The example has shown the use of chromium oxide supported on alumina as the catalyst for the dehydrogenation process. Any other active high temperature dehydrogenation catalyst known to the art may be used, however. From a consideration of chemical composition, the oxides of the transition metals of groups IV, V, and VI of the periodic table, such as chromium, molybdenum, tungsten, vanadium, titanium, zirconium, and the like, are the best catalysts. Chromium oxide has been used most extensively and the oxide is more active when supported on a carrier of relatively lower activity, such as alumina. Activated alumina alone promotes dehydrogenation but is less effective than chromium oxide on alumina. The high adsorptive activity as well as the porous solid structure of alumina constitutes the reason for its suitability. Relation of high adsorptive capacity to catalytic activity is evidenced by the necessity of small amounts of water vapor, about 0.1 mole per cent, in the reaction.

The temperature at which the reaction may be carried out may be varied from about 450° C. to about 800° C., although a preferable range is from about 550° C. to about 650° C. A particularly applicable temperature range is from about 600° C. to about 630° C. The length of time necessary to effect conversion of the ethyl pyridine to the corresponding vinyl compound will depend upon the rate at which the ethyl pyridine is passed through the reaction zone and upon the temperature utilized. In general, substantial conversion to the vinyl compound may be obtained utilizing a reaction temperature of 600° C. to 625° C. and a space velocity (parts of feed mixture/part of catalyst/hour) of about 0.5 to about 0.8.

Upon completion of the dehydrogenation process, the reaction mixture may be treated in one of two ways or a combination of both in order to isolate the vinyl pyridine. Fractional distillation may be utilized, but this requires a very efficient fractionating column and is somewhat disadvantageous in that prolonged heating will cause considerable loss in reaction product due to formation of a rubberlike residue. Crystallization from light petroleum naphtha, for example, at low temperatures also may be used to isolate the vinyl pyridine. This procedure is somewhat undesirable when large quantities of the reaction product are involved, however, consequently the most favorable procedure is a combination of fractional distillation under reduced pressure and fractional crystallization. A rapid distillation may be used first of all to concentrate the vinyl pyridine in certain fractions and these fractions then may be dissolved in a solvent, such as pentane, cooled to a temperature of about −30° C. to about −70° C. to form the pure vinyl compound by crystallization. Solvents other than pentane, such as propane, butane, hexane, heptane, octane, nonane and decane, also may be used. In general, any low boiling petroleum hydrocarbon solvent is operable, the primary requisite for such a solvent being that it maintain its liquid state at the low temperatures used during the crystallization.

By the process of this invention, it is possible to produce the vinyl pyridines more simply and economically than heretofore. The process is relatively free of side reactions and may be operated continuously. The vinyl pyridines produced by this process may be used as monomers in the preparation of resins and synthetic rubbers. The resinous materials prepared using vinyl pyridines are valuable for many purposes since they contain a weakly basic nitrogen atom. The rubberlike materials, such as the copolymer of butadiene and 2-methyl-5-vinylpyridine, have many characteristics which render them useful in various fields.

What I claim and desire to protect by Letters Patent is:

1. The process of preparing a vinyl substituted pyridine compound which comprises passing an ethyl substituted pyridine over an active high temperature dehydrogenation catalyst at a temperature between about 450° C. and about 800° C., and fractionally crystallizing the resulting reaction mixture comprising the vinyl substituted pyridine compound and the unchanged ethyl substituted pyridine compound from a low boiling petroleum hydrocarbon solvent at a temperature between about −30° C. and about −70° C.

2. The process of preparing a vinyl substituted pyridine compound which comprises passing an ethyl substituted pyridine over an active high temperature dehydrogenation catalyst at a temperature between about 450° C. and about 800° C., fractionally distilling the resulting reaction mixture comprising the vinyl substituted pyridine compound and the unchanged ethyl substituted pyridine compound, and fractionally crystallizing the distillation fractions rich in the vinyl substituted pyridine compound from a low boiling petroleum hydrocarbon solvent at a temperature between about −30° C. and about −70° C.

JOHN T. HAYS.

REFERENCES CITED

The following references are of record in the file of this patent:

UNITED STATES PATENTS

| Number | Name | Date |
|---|---|---|
| 2,141,611 | Malishev | Dec. 27, 1938 |
| 2,300,971 | Roberts | Nov. 3, 1942 |
| 2,376,532 | Egloff | May 22, 1945 |
| 2,376,709 | Mattox | May 22, 1945 |
| 2,402,158 | Glowacki | June 18, 1946 |

FOREIGN PATENTS

| Number | Country | Date |
|---|---|---|
| 849,126 | France | 1939 |
| 115,967 | Australia | Sept. 1942 |
| 132,042 | Austria | Feb. 1935 |

OTHER REFERENCES

Berichte, 20 (1887), p. 1643.

J. Amer. Chem. Soc., May 1942, pp. 1093 and 1094.

Degering: Organic Nitrogen Compounds, 1945, p. 628.